United States Patent
Ibanez et al.

(10) Patent No.: US 12,341,348 B2
(45) Date of Patent: Jun. 24, 2025

(54) SOLAR FARM INTERCONNECTION RECONFIGURATIONS

(71) Applicant: Inventus Holdings, LLC, Juno Beach, FL (US)

(72) Inventors: Mario Ibanez, Charlotte, NC (US); Joseph Stansbery, Minneapolis, MN (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 66 days.

(21) Appl. No.: 18/457,772

(22) Filed: Aug. 29, 2023

(65) Prior Publication Data

US 2025/0079846 A1    Mar. 6, 2025

(51) Int. Cl.
*H02J 3/46* (2006.01)
*H02J 3/00* (2006.01)
*H02J 3/38* (2006.01)

(52) U.S. Cl.
CPC ............ *H02J 3/381* (2013.01); *H02J 3/0075* (2020.01); *H02J 3/46* (2013.01); *H02J 2300/24* (2020.01)

(58) Field of Classification Search
CPC .......... H02J 3/007; H02J 3/0075; H02J 3/381; H02J 3/46; H02J 2300/20; H02J 2300/22; H02J 2300/24; H02J 2300/26
See application file for complete search history.

(56) References Cited

U.S. PATENT DOCUMENTS

| | | | |
|---|---|---|---|
| 6,111,767 A | 8/2000 | Handleman | |
| 7,471,073 B2 | 12/2008 | Bettenwort et al. | |
| 8,369,999 B2 | 2/2013 | Beck | |
| 8,390,147 B2 | 3/2013 | Stauth et al. | |
| 8,697,983 B2 | 4/2014 | Cashion et al. | |
| 8,957,301 B2 | 2/2015 | Lyden | |
| 9,299,861 B2 | 3/2016 | Meyer et al. | |
| 9,502,897 B2 | 11/2016 | Makover et al. | |
| 9,785,172 B2 | 10/2017 | Agarwal et al. | |

(Continued)

OTHER PUBLICATIONS

Yousri, Dalia et al., Mitigating mismatch power loss of series-parallel and total-cross-tied array configurations using novel enhanced heterogeneous hunger games search optimizer. sciencedirect.com. Nov. 2022.

(Continued)

*Primary Examiner* — Levi Gannon
(74) *Attorney, Agent, or Firm* — Jeffrey N. Giunta; Fleit Intellectual Property Law (57) ABSTRACT

A solar farm and method of operating same. The solar farm has a first and second inverters with a first and second DC power input, respectively, and also has a first group of solar panels and a second group of solar panels. A first switch selectably alternately connects the first group of solar panels to one of either DC power inputs. An inverter current monitor monitors electrical current flowing into or out of the first inverter. A controller determines that the first inverter is operating as a clipping inverter based on a current measurement by the inverter current monitor while the first switch is connecting the first group of solar panels to the first DC power input. The controller also switches, when it is determined that the first inverter is operating as a clipping inverter, the first switch to connect the first group of solar panels to the second DC power input.

20 Claims, 7 Drawing Sheets

(56) References Cited

U.S. PATENT DOCUMENTS

| | | | |
|---|---|---|---|
| 9,799,779 | B2 | 10/2017 | Krein et al. |
| 10,133,245 | B2 | 11/2018 | Bixel |
| 10,340,699 | B2 | 7/2019 | Uno et al. |
| 10,386,878 | B2 | 8/2019 | Catthoor et al. |
| 10,819,248 | B2 | 10/2020 | Mousavi |
| 11,241,799 | B2 | 2/2022 | Clemenzi et al. |
| 11,444,549 | B2 | 9/2022 | Rotzoll et al. |
| 11,487,279 | B2 | 11/2022 | Calo Lopez et al. |
| 2003/0227219 | A1* | 12/2003 | Beck .......... H02J 3/46 307/38 |
| 2007/0179720 | A1* | 8/2007 | Becker .......... H02J 3/26 702/58 |
| 2009/0302681 | A1* | 12/2009 | Yamada .......... H02J 7/35 700/286 |
| 2010/0109442 | A1* | 5/2010 | Vega Betoret .......... H02J 3/381 307/82 |
| 2010/0250018 | A1* | 9/2010 | Hauf .......... H02J 1/10 700/297 |
| 2013/0249300 | A1* | 9/2013 | Fishman .......... H01L 31/02016 307/82 |
| 2014/0012520 | A1 | 1/2014 | Zhao et al. |
| 2014/0021793 | A1* | 1/2014 | Chu .......... H02J 3/381 307/82 |
| 2020/0358396 | A1 | 11/2020 | Rao et al. |

OTHER PUBLICATIONS

Khadkikar, Interline Photovoltaic (I-PV) power system—A novel concept of power flow control and management, "dspace.mit.edu. IEEE, 2011. 1-6."

Raturi, Grid-connected PV systems in the Pacific Island Countries, "repository.usp.ac.fj.Renewable and Sustainable Energy Reviews. vol. 58, May 2016, pp. 419-428."

Zuhaib, Performance Analysis of a Utility-Scale Grid Integrated Solar Farm Considering Physical and Environmental Factors, researchgate.net.The Institution of Engineers (India) 2020.

Shams, et al., Optimal Photovoltaic Array Reconfiguration to Reduce Partial Shading Losses, Research Gate, Transactions on Sustainable Energy, vol. 4, No. 1, Jan. 2013, pp. 145-153.

Operating Manual, SMA Solid-Q 50/SMA Solid-Q Pro 60, Version 1.0, SMA New Energy (Jiangsu) Co. Ltd., pp. 1-76, 2018.

* cited by examiner

SOLAR FARM INTERCONNECTION RECONFIGURATIONS

FIELD OF THE DISCLOSURE

The present disclosure generally relates to photovoltaic solar farms, and more particularly to reconfiguration of interconnects between solar panels and power inverters of such solar farms.

BACKGROUND

Solar Photovoltaic (PV) electric generation sites, which are referred to below as solar farms, have solar panels that include a number of solar cells to generate DC power that is provided to inverters for conversion to AC power that is provided as an output of the solar farm. Generally, a solar farm has a large number of photovoltaic panels, which are referred to as solar panels below, that are conceptually divided into separate groups with each group connected to a different inverter. In some examples, large solar farms are able to have more than 100 inverters that are each provided DC power from a particular group of solar panels.

Some solar farms are constructed with groups of solar panels that are able to provide a greater amount of DC power to the inverter to which they are connected than the maximum input power level for that inverter. Such inverters typically adjust their operating parameters, such as adjust the solar panel DC voltage, to reduce the amount of delivered power and maintain the inverter within its maximum input power limit. Such reductions in DC input power reduce the overall efficiency of the solar farm by not utilizing all of the available DC power produced by the solar panels.

Moving cloud cover over a solar farm causes variable reductions in the DC output power of the solar panels where the sunlight is blocked by clouds. As the clouds move across the solar farm, different groups of solar panels have their output power temporarily reduced. As the clouds move past a particular group of solar panels, their output power will then increase.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods operate to improve the efficiency of solar farms. As an illustrative example, a solar farm has a group of solar panels that is rated to produce 1,400 KW. In general, the rating for solar panels refers to the amount of DC power the panels can produce under what is referred to as Standard Test Conditions (STC), which is a solar energy level of 1000 W/m$^2$, 25 degrees Celsius, and a sea level air mass of 1.5. In this illustrative example, this group of solar panels is connected to provide DC input power to an inverter that has a rated maximum input power level of 1000 KW. This configuration is referred to as having a group of solar panels that is able to produce DC electric power that is in excess of the rated maximum input power for that inverter. It is understood that these solar panels produce their maximum rated output under strong sunlight conditions and the DC electrical power produced by that group of solar panels will vary based on environmental conditions such as sun light intensity, temperature, other factors, or combinations of these.

A condition generally referred to as "clipping" exists when a group of solar panels is able to deliver a level of DC input power to an inverter that exceeds the maximum rated input power for that inverter. In the above example, the inverter is said to be clipping when the group of solar panels is able to produce more than 1000 KW of DC power to be delivered to the inverter. In an example, a "clipping inverter" continues operation by varying operational parameters of the group of solar panels that are providing power to that inverter in order to reduce the DC power produced by that group of solar panels and to thus maintain the power produced by that group of solar panels at a level that is equal to or below the maximum rated input power of that inverter. In an example, an inverter is able to reduce the amount of DC power it is receiving by varying its DC input voltage into which the solar panels are provided DC power and thus a clipping inverter in an example is able to reduce its DC input power by varying its DC input voltage. In various examples, due to the non-linear response of the electrical output of solar panels, adjustments of the DC input voltage up or down affects the total DC power output of those panels and such adjustments can be used to reduce the DC output power of the solar panels and thus reduce the DC input power to the inverter. In the above example, a clipping inverter is able to reduce or increase the DC voltage or the DC current of the solar panels to cause the DC power level produced by that group of solar panels to not exceed the rated input DC power of the inverter, such as 1000 KW. In such an operational scenario, that group of solar panels is able to produce a DC power level than can be processed by the inverter, and that amount of available power is thus lost.

In an example, the below described systems and methods are directed to applications in solar farms such as that described above where at least one inverter is connected to a group of solar panels that is able to produce DC electric power that is in excess of the rated maximum input power for that inverter. In some examples, the ratios between the total rated DC output power (as produced under STC conditions) of solar panels in a group connected to one inverter, and the rated maximum input power of the inverter connected to that group of solar panels, generally varies between 1:1 and 1.6:1. This design is able to cause a condition during periods of time, such as under bright sunlight conditions, when the total potential DC power from the panels is higher than the amount of power that the inverter can accept. This condition is referred to as DC clipping where the excess DC power is "clipped" and the inverter becomes a clipping inverter where the excess power is simply lost such as by the sunlight becomes heat rather than electric power.

Moving cloud cover and its associated variable solar light illuminating each group of solar panels caused by the moving clouds is able to result in potentially relatively rapid variations in DC output power of a group of solar panels. Such rapid variations in DC output power are able to cause oscillations in the DC power received by the inverter connected to that group of solar panels and such oscillations are able to affect the operation of that inverter. Such oscillations in the DC power provided into an inverter can cause corresponding oscillations in the AC power output of that inverter and such oscillations can complicate integration of the output power of that inverter with other AC power sources and transmission and/or distribution systems.

The below described systems and methods further operate to improve the operation of solar farms experiencing the above conditions by determining when a first inverter in a solar farm is operating as a clipping inverter, i.e., when the solar panels providing DC power to the first inverter are able to produce more DC power than the rated maximum DC input power of that inverter. The below described systems and methods are also able to additionally, or alternatively, improve the operation of solar farms when an inverter is receiving rapidly varying DC power input. In response to detection of such conditions, the operation of a controller for the solar farm, in an example, redistributes some of that DC power to another inverter so that the excess DC power, or the variation of the DC power, being delivered to one or more inverters is reduced. In some examples, solar panels in a solar farm are divided into a number of groups and each inverter on a solar farm is able to be selectively provided with DC power from a part of two or more respective groups of solar panels. In some of these examples, each group of solar panels is divided into two or more sub-groups, and the wiring of the solar farm supports switching the DC power produced by one or more sub-groups in each group between to one of two or more inverters.

The design of equipment to implement the routing and switching of DC power between groups of solar panels and inverters in various examples is able to be based on various design criteria. In an example, selection of which two or more groups of solar panels to connect to a particular inverter is able to be based on observations of correlations of simultaneous cloud cover over particular locations of the different groups of solar panels. In an example, such correlations are determined based on site surveys that include one or more field surveys conducted prior to construction of the solar farm. The wiring of the solar farm is such that groups that have a low correlation of simultaneous cloud cover are able to be switched to provide power to each inverter.

Figure 1:
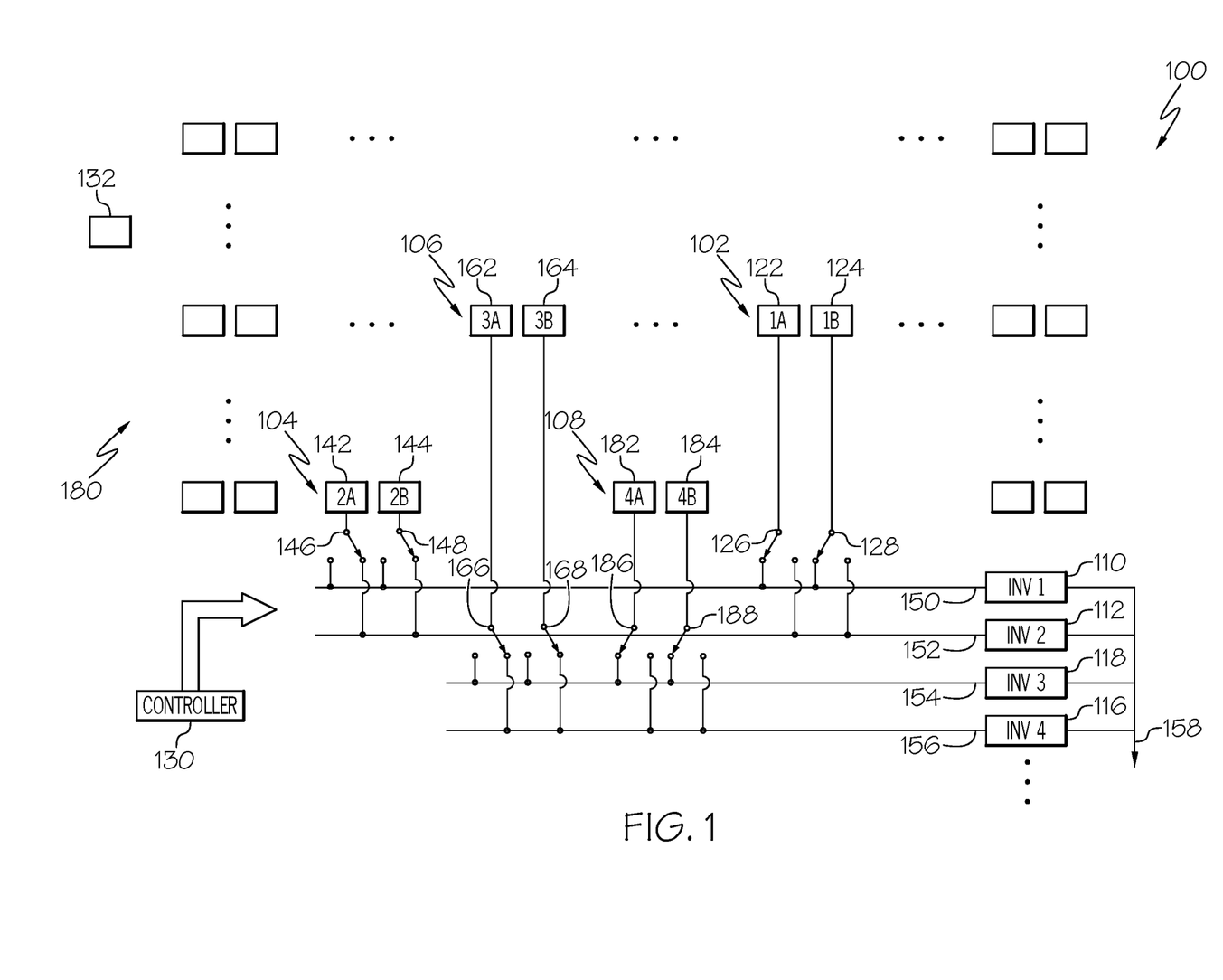
FIG. 1 illustrates an example solar farm portion, according to an example.

FIG. 1 illustrates an example solar farm portion 100, according to an example. The illustrated example solar farm portion 100 depicts a sub-section of an entire solar farm and depicts a limited number of components in order to more clearly and concisely describe relevant aspects of the below described systems and methods. The example solar farm portion 100 in an example is a large, utility scale photovoltaic solar farm and the following discussion focuses on four (4) groups of solar panels that provide DC power to four (4) inverters. The example solar farm portion 100 also has a number of other solar panels and inverters that are not discussed below but are indicated by ellipses.

The example solar farm portion 100 depicts a utility scale solar farm that has a large solar panel field 180. The solar panel field 180 is shown to include subsets of solar panels in this example where that subset includes a number of solar panels that are divided into eight (8) sub-groups of solar panels that are arranged as four (4) groups of two (2) sub-groups each. A first group of solar panels 102 consists of a sub-group 1A 122 and sub-group 1B 144, a second group of solar panels 104 consists of sub-group 2A 142 and sub-group 2B 144, a third group of solar panels 106 consists of sub-group 3A 162 and sub-group 3B 164, and a fourth group of solar panels 108 consists of sub-group 4A 182 and sub-group 4B 184. Each of these sub-groups is able to be switched to provide DC power to one of two particular inverters as is described below.

As depicted for the example solar farm portion 100, the pairs of groups of solar panels that have sub-groups that are able to be switched to provide DC power to two inverters, such as the first group of solar panels 102 and the second group of solar panels 104, are located in locations that are physically separated from each other. As discussed in further detail below, the amount of separation between such groups is able to be selected based on measured cloud cover correlations vs. distance in order to reduce the likelihood of simultaneous cloud cover for both of those two groups. The below discussion refers to pairs of inverters that are connected to switches that allow groups of two solar panels to be switched between them, but it is clear that these systems and methods are readily adapted to operate with systems where more than two groups of solar panels can be switched to provide DC power to any number of inverters.

The example solar farm portion 100 depicts four (4) inverters, inverter 1 110, inverter 2 112, inverter 3 116, and inverter 4 118. Each of the inverters receive DC power from selected sub-groups of solar panels, as is described below, and each inverter provides AC electrical power to an AC power output 158 of the solar farm. In conventional solar farms, each group of solar panels is connected to provide DC power to one inverter, e.g., the first group of solar panels 102 is connected to inverter 1 110 and the second group of solar panels 104 is connected to inverter 2 112, and so on in a conventional system. In a conventional arrangement, each inverter and the group of solar panels providing DC power to them are collocated such that each grouping of panels delivers DC power to the nearest inverter, or in other words the inverter is placed adjacent to the group of panels it will receive power from. The present example provides electrical switching so as to allow selectively switching the DC power from each sub-group to one of two inverters.

The illustrated example depicts groups of solar panels that are each divided into two sub-groups where each sub-group is connected to a switch that supports switching DC power produced by each sub-group to one of two inverters. In general, a solar farm is able to have any number of groups any relation to one another, or with no relations between them at all, where each group provides DC power to a switch that supports switching that DC power to any one of any suitable number of inverters, such as the two inverters of the illustrated example or between, e.g., a first inverter and another inverter that is different from the first inverter. In an example, the sub-group 1A 122, sub-group 1B 144, sub-group 2A 142, and sub-group 2B 144 are each able to be referred to as separate groups of solar panels. In some examples, each inverter has or is attached to one or more inverter current monitors that is able to measure and report electrical current measurements for its associated inverter. In examples, an inverter is able to have an internal inverter current monitor that determines or estimates values of one of electrical current flowing into the inverter through its DC power input, determines or estimates values of AC current flowing out of an AC power output of that inverter, or combinations of these, and reports these values as a current measurement. In various examples, electrical current measurements are able to be reported in any format, including as electrical current, electrical power at an assumed or measured voltage, in any other format, or in combinations of these.

In the illustrated example solar farm portion 100, the four sub-groups of solar panels that provide DC power to inverter 1 110 and inverter 2 112 are able to be selectively switched to provide their DC output power to either of those two inverters. As shown, the output of sub-group 1A 122 is connected to a first switch 126 that is able to selectably connect the DC power output of sub-group 1A 122 to either the input of inverter 1 110 via a first inverter input 150, or to the input of inverter 2 112 via a second inverter input 152. The other illustrated sub-groups are similarly able to have their DC output power selectably connected to one of two inverters. The output of sub-group 1B 124 is connected to a second switch 128 that also provides DC output power to either inverter 1 110 via the first inverter input 150 or to inverter 2 112 via the second inverter input 152. Similarly, the outputs of sub-group 2A 142 and sub-group 2B 144 are able to selectively provide DC power to either inverter 1 110 via the first inverter input 150 or to inverter 2 112 via the second inverter input 152 by a third switch 146 and a fourth switch 148, respectively.

The sub-groups of solar panels that provide DC power to inverter 3 114 and inverter 4 116 are also able to have their outputs switched to provide that DC power to one of either of those inverters. The outputs of sub-group 3A 162 and sub-group 3B 164 are able to selectively to provide DC power to either inverter 3 114 via a third inverter input 154 or to inverter 4 116 via a fourth inverter input 156 by a fifth switch 166 and a sixth switch 168, respectively. The outputs of sub-group 4A 182 and sub-group 4B 184 are selectively able to provide DC power to either inverter 3 114 via a third inverter input 154 or to inverter 4 116 via a fourth inverter input 156 by a seventh switch 186 and an eight switch 188, respectively.

A controller 130 controls various aspects of the components illustrated in the example solar farm portion 100 and, in some examples, other operations of the solar farm. In an example, controller 130 controls operations of the switches that control which inverter receives DC power from each sub-group of solar panels. In an example, the controller 130 receives information from each inverter that indicates if the inverter is currently in a clipping mode, or operating as a clipping inverter. Such information in an example includes the present amount of AC power being produced by each inverter and if the inverter is producing its rated output, it is assumed that the inverter is clipping. In some examples, sub-groups of solar panels are able to have current monitors that report the amount of DC current produced by each sub-group of solar panels, the amount of DC current being carried by various conductors, such as each input to one or more inverter (e.g., the first inverter input 150), or any combination of these. Based on these measurements, processing performed by the controller 130 determines how to control the switches, such as the first switch 126 and second switch 128, to selectively route DC power from each sub-group of solar panels to one of two inverter inputs according to the connections to the switches routing DC power from the sub-groups of solar panels to the inverter inputs.

The controller 130 is also able to determine switching confirmations based on criteria that include other factors. In some examples, the controller 130 determines switching configurations on criteria that includes current sky conditions. In such an example, one or more meteorological station 132 is able to perform measurements to characterize sky conditions over the solar farm. In an example, a meteorological station 132 is able to measure various types of irradiance including Global Horizontal Irradiance (GHI), Direct Normal Irradiance (DNI), and Plane of Array Irradiance (POAI). Based on these measurements, sky conditions are able to be characterized in an example as either one of 1) clear sky; 2) overcast; or 3) passing (or moving) clouds.

In an example, an "overcast" sky condition is determined based on a low value of DNI (e.g., less than 100 W/M$^2$) and values of GHI and POAI that are within 10% of each other. These measurements indicate that the light that is striking the panels is coming from "all directions" as opposed to directly from the sun. In this example, the thresholds of 100 and 10% can be determined by a practitioner in the field. In further examples, other values are able to be used based upon the design of a particular installation.

In an example, a "clear sky" sky condition is determined based on values of POAI or GHI being within 10% of mathematically calculated expected POAI or GHI values based on clear sky conditions. In this example, the thresholds of 10% can be determined by a practitioner in the field. In further examples, other values are able to be used based upon the design of a particular installation.

If the measurements made by the meteorological station 132 do not indicate that the sky conditions are clear sky or overcast, the sky condition is determined in an example to be "passing clouds." When the sky condition is determined to be passing clouds, in one example the following is performed to determine whether to "swap" the switches for sub-groups of solar panels so as to provide DC power to another inverter.

The following example refers to "pairs" of inverters and groups of solar panels and their default configuration. In the following discussion, a "pair" of inverters and solar panels refers to the two inverters and the corresponding two groups of solar panels that provide DC power input to those two inverters. An example of such a pair of inverter and solar panels is the first group of solar panels 102 and the second group of solar panels 104 and the first inverter 110 and the second inverter 112 that receives DC power from them. The "default" configuration of such a group is that the DC power output of each sub-group is connected to provide power to an inverter that is a normal configuration. In an example, the default configuration is where the sub-groups of the first group of solar panels 102 are in their normal configuration to provide DC power to inverter 1 110 and the sub-groups of the second sub-group of solar panels 104 are in their normal configuration to provide DC power to inverter 2 112. The following discussion further discusses "swapping" outputs of sub-groups. In the above example pair of inverter and solar panels, swapping includes changing the configuration of switches of one sub-group of each of the two groups in a pair such that each of those sub-groups is providing DC power to the other inverter, such as switching the output from sub-group 1A 122 from providing DC power to inverter 1 110 to providing DC power to inverter 2 112, and also switching the output from sub-group 2A 142 from providing DC power to inverter 2 112 to providing DC power to inverter 1 110.

In an example, a process performed by controller 130 includes determining, at intervals such as one minute, whether only one inverter, and not both inverters, in a pair of inverters is operating at full power. In an example, an inverter that is determined to be operating at full power is presumed to be in a situation where the potential available DC power is higher than its maximum rated input power and thus the inverter is operating in a clipping mode and is thus determined to be a clipping inverter. This time interval is able to be adjusted in various examples based on various operating considerations. In an example, this determination is made based on reading the output AC power for the inverter. If only one inverter in the pair of inverters is at full power, the output of one sub-group of the two groups are swapped so that the outputs of 1 sub-group of solar panels supplying DC power to a first inverter and a second inverter in the pair are connected to provide DC power to the other inverter in the pair. After such a swap, if a power increase (total from the pair, found by adding the AC power from each inverter) is observed, then this configuration is maintained. If it is observed that this swapping caused a total output power reduction, the swapping is reversed and the switching returns to its prior configuration.

Examples of instances of the above swapping include cases where the overall AC power output increases and other cases where the overall AC power output does not increase. An example of a case where swapping from the default configuration produces an increase in overall AC power output is a case where both of the sub-groups of the first group of solar panels 102 (i.e., sub-group 1A 122 and sub-group 1B 124) are unshaded, and where sub-group 2A 142 is fully shaded while sub-group 2B 144 is eighty-five (85) percent shaded. In a case where each group of solar panels produces enough DC power to allow an inverter to produce 1.4 MW when directly exposed to the sun and unshaded, inverter 1 110 would produce 0.7 MW and inverter 2 112 would produce 0.805 MW after swapping. In the default configuration, inverter 1 110 would receive enough DC power to produce 1.4 MW, but since it is only able to produce 1 MW maximum the excess 0.4 MW would not be produced and thus lost. As noted above, evaluation of the AC power output of each inverter is performed each minute, so that as long as inverters are not producing their maximum AC output, no swapping takes place. Thus, when in the default configuration, the increase in AC power output observed after the swap will cause the configuration to be maintained.

In an example, if the sky conditions are determined to be either "clear sky" or "overcast," each group of solar panels is connected to provide DC power to its default inverter.

Figure 2A:
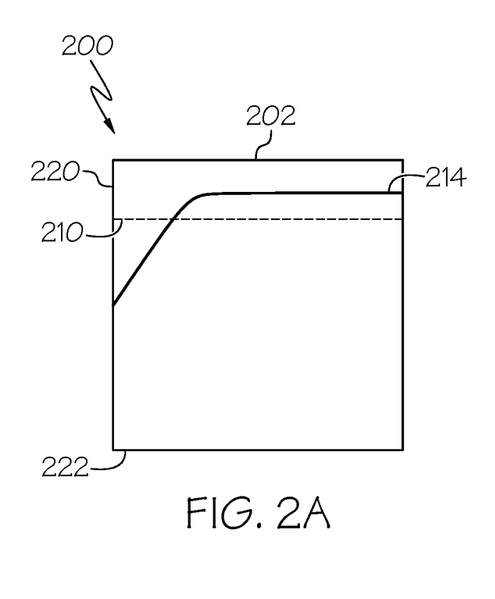
FIG. 2 illustrates an excess solar group output power adjustment, according to an example.
Figure 2B:
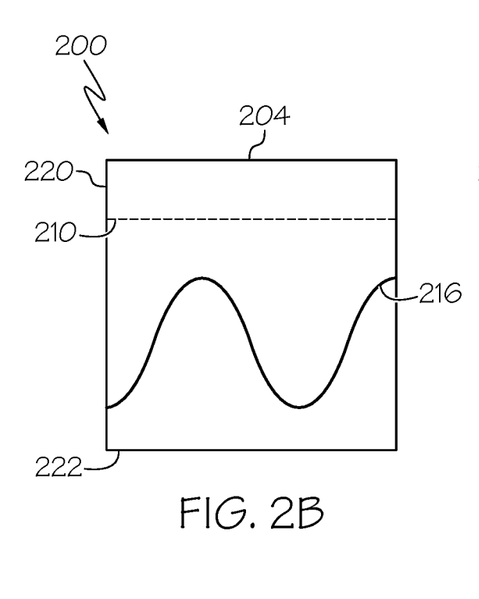
Figure 2C:
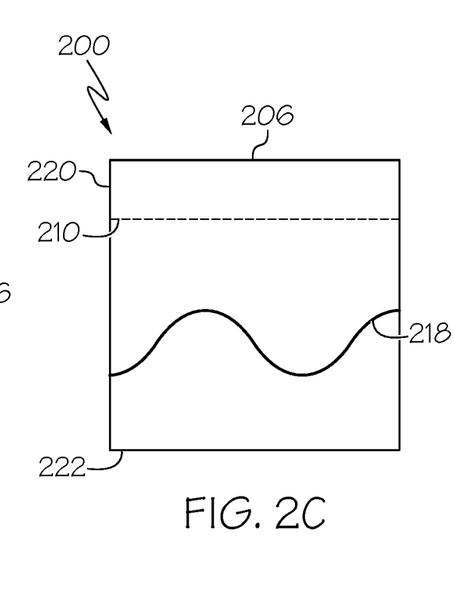

FIG. 2 illustrates excess solar group output power adjustment time graphs 200, according to an example. With reference to the example solar farm portion 100 and the example scenario described above, the excess solar group output power adjustment time graphs 200 illustrate example plots of DC power output vs. time in a scenario where one group of solar panels is producing DC power output in excess of what one inverter is able to process while another group is producing a reduced DC power output level due to, for example, blockage of the sun or misalignment of solar panels in that group.

The excess solar group output power adjustment time graphs 200 include an excess DC power output vs time plot 202 and a reduced DC power output vs time plot 204. The excess DC power output vs time plot 202 depicts a time plot of the potential DC output power of a group of solar panels that are receiving a high level of sunlight and are capable of producing more DC power than can be processed by one inverter. The excess DC power output vs time plot 202 includes a horizontal time axis 222, a vertical DC power axis 220 and an inverter power limit line 210. An excess DC power curve 214 depicts the DC power produced by one group of solar panels that climbs to a level that is in excess of the inverter power limit line 210.

The reduced DC power output vs time plot 204 depicts a time plot of DC output power of a group of solar panels that is reduced, such as by cloud cover, blockages, misalignment of panels, or due to other reasons. The reduced DC power output vs time plot 204 also includes a horizontal time axis 222, a vertical DC power axis 220, and an inverter power limit line 210. An adjusted DC power curve 216 depicts the reduced DC power output produced by that group of solar panels.

An example of a scenario reflecting the excess solar group output power adjustment time graphs 200 includes the first group of solar panels 102, which includes sub-group 1A 122 and sub-group 1B 124, being directly illuminated by the sun at a near perpendicular angle, while the second group of solar panels 142, which includes sub-group 2A 142 and sub-group 2B 144, are obscured by clouds or otherwise are producing a reduced level of DC power output.

In order to better utilize the potential DC power output from these two groups of solar panels, the DC power outputs of sub-group 1A 122 and sub-group 2A 142 are switched so as to be connected to the other inverter, i.e., to inverter 2 112 and inverter 1 110 respectively. This switching is achieved by changing the position of first switch 126 and third switch 146, respectively. This causes the higher output from the first group of solar panels 102 to be split between two inverters and combined with the split reduced output of the second group of solar panels 104 and thus provides the two inverters with DC power levels that are below the maximum capacity of those inverters.

Switching, or swapping, these outputs in this manner results in a DC power input into both inverter 1 110 and inverter 2 112 that is similar to that illustrated by the adjusted DC power input vs time plot 206. The adjusted power input vs time plot 206 includes a horizontal time axis 222, a vertical DC power axis 220, also depicts the inverter power limit line 210, and depicts an adjusted DC power curve 216. Assuming substantially similar illumination of sub-group 1A 122 and sub-group 1B 124, and also substantially similar illumination of sub-group 2A 142 and sub-group 2B 144, the adjusted DC power curve 216 has values that are roughly the sum of one half of the excess DC power curve 214 and the adjusted DC power curve 216. This results in more of the total DC power output of these two groups being processed by the two inverters and thus increases overall solar farm AC power output.

Figure 3A:
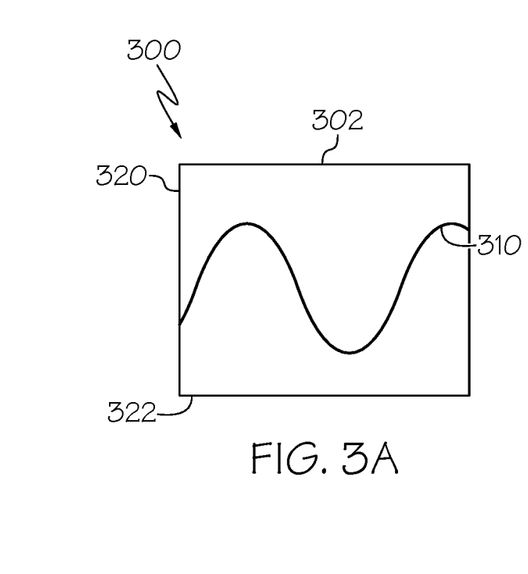
FIG. 3 illustrates a partial cloud cover solar group output, according to an example.
Figure 3B:
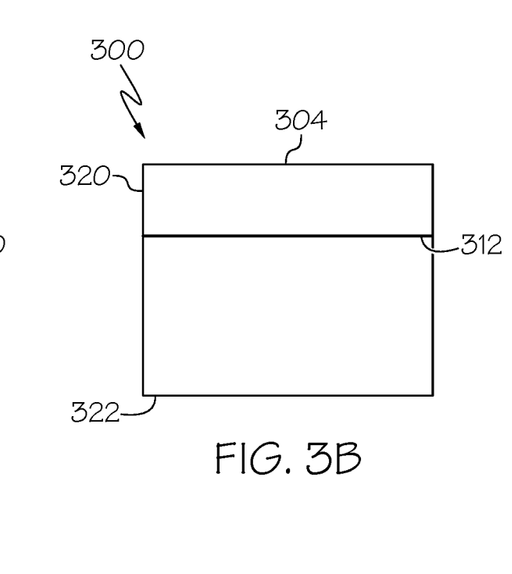
Figure 3C:
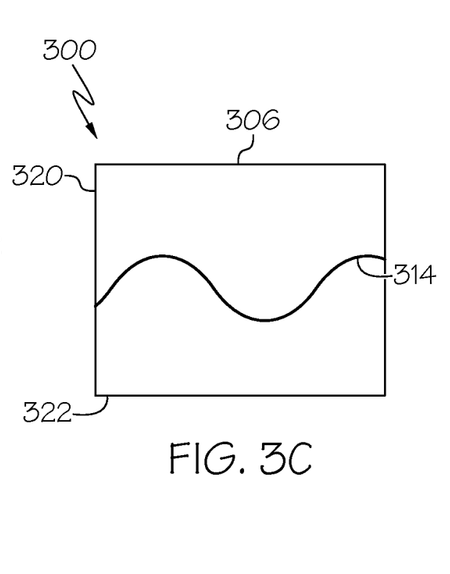

FIG. 3 illustrates a partial cloud cover solar group output time graphs 300, according to an example. With reference to the example solar farm portion 100 described above, the partial cloud cover solar group output time graphs 300 includes illustrations of example plots of DC power output by two groups of solar panels where one is subjected to varying cloud cover and the other is not.

The partial cloud cover solar group output time graphs 300 includes a first DC power output vs time plot 302 and a second DC power output vs time plot 304. The first DC power output vs time plot 302 depicts a time plot of DC output power of a group of solar panels that are obscured from the sun by moving clouds. The first DC power output vs time plot 302 includes a horizontal time axis 322 and a vertical DC power axis 320. A partially shaded DC power curve 310 depicts the variation in DC power produced by one group of solar panels that are obscured by moving clouds.

The second DC power output vs time plot 304 depicts a time plot of DC output power of a group of solar panels that are directly illuminated by the sun. The second DC power output vs time plot 304 also includes a horizontal time axis 322 and a vertical DC power axis 320. A directly illuminated DC power curve 312 depicts the relatively low variation in DC power produced by that group of directly illuminated solar panels.

An example of a scenario reflecting the partial cloud cover solar group output time graphs 300 includes clouds partially obscuring the solar panels in the first group of solar panels 102, which includes sub-group 1A 122 and sub-group 1B 124, while the solar panels in the second group of solar panels 104, which includes sub-group 2A 142 and sub-group 2B 144, are illuminated by direct sunlight. The first DC power output vs time plot 302 depicts the combined DC power outputs of sub-group 1A 122 and sub-group 1B 124 and thus the DC power input to inverter 1 110 when both of those sub-groups are connected to the first inverter input 150. The second DC power output vs time plot 304 depicts the combined DC power outputs of sub-group 2A 142 and sub-group 2B 144 and thus the DC power input to inverter 2 120 when both of those sub-groups are connected to the second inverter input 152.

In order to reduce the variation in DC power input into inverter 1 110 and thus simplify its operation in combination with other inverters at the solar farm, the DC power outputs of sub-group 1A 122 and sub-group 2A 142 are switched so as to be connected to the other inverter, i.e., to inverter 2 112 and inverter 1 110 respectively. This switching is achieved by changing the position of first switch 126 and third switch 146, respectively. This causes the more rapidly varying DC power output of sub-group 1A 122 and sub-group 1B 124 to be combined with the more consistent DC power output of sub-group 2B 144 and sub-group 2A 142 respectively. Switching, or swapping, these outputs in this manner results in a DC power input into both inverter 1 110 and inverter 2 112 that is similar to that depicted in the reduced variation DC power input vs time plot 306. The reduced variation DC power input vs time plot 306 includes a horizontal time axis 322, a vertical DC power axis 320, and a reduced variation power curve 314. Assuming substantially similar illumination of sub-group 1A 122 and sub-group 1B 124, and also substantially similar illumination of sub-group 2A 142 and sub-group 2B 144, the reduced variation power curve 314 will have an average value of roughly one half of the sum of the average value of the partially shaded DC power curve 310 and directly illuminated DC power curve 312 with roughly one half of the variation of the partially shaded DC power curve 310.

Figure 4:
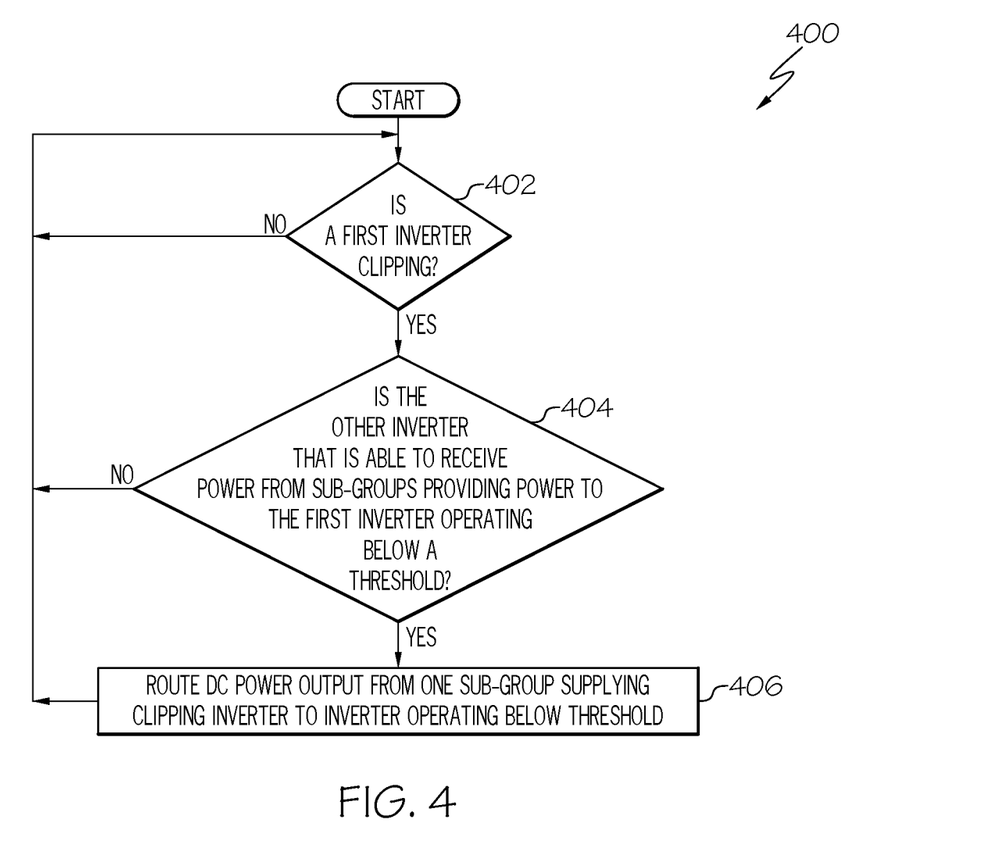
FIG. 4 illustrates a solar farm power balancing process, according to an example.

FIG. 4 illustrates a solar farm power balancing process 400, according to an example. The solar farm power balancing process 400 is an example of a process performed by the controller 130 to control the switches that connect the output of sub-groups of solar panels to one of two inverters. The solar farm power balancing process 400 is an example of a process to perform the swapping of DC power inputs to reduce peak DC power delivered to an inverter that is being supplied by a group of solar panels that is receiving enough sunlight to potentially produce more DC power than that inverter is able to process, as is discussed above with regards to the example solar farm portion 100 and the excess solar group output power adjustment time graphs 200. In an example, the solar farm power balancing process 400 redirects DC power from being provided to an inverter that is clipping excess DC power to being provided to another inverter that is able to process that power (in other words, it would not need to clip).

The solar farm power balancing process 400 determines, at 402, if a first inverter is clipping. An inverter is determined to be clipping when it is actively receiving incoming DC power over a limit that it is rated to handle. In an example, an inverter is determined to be clipping based on the level of AC power output the inverter is reporting as its present output. If the inverter is reporting that it is producing at or near its rated AC power output it is determined to be clipping in an example and thus is actively receiving incoming DC power over the limit that it is rated to handle. When an inverter is clipping, the DC power in excess of the rated input for the inverter is wasted.

In a further example, a determination is made that the inverter is clipping based on a combination of reported AC power output and meteorological conditions. In such an example, when an inverter is reporting that its AC output power is at its rated AC output, it is possible that the solar panels providing power to that inverter are capable of producing more DC power than is used by the inverter to output the maximum AC power. In a case where the solar panels are providing more than is used by the inverter to output the maximum AC power, the inverter is in a clipping state. In another case, the solar panels are operating so as to only produce the amount of DC power that is used by the inverter to output its maximum AC power and the inverter is thus not in a clipping state. Basing the determination of the clipping state of an inverter based only on AC output power could potentially result in mischaracterizing the status of the inverter. In order to more correctly characterize the clipping state of the inverter in some examples, measurements of solar irradiance on the solar panels are incorporated into the clipping determination. In one such example, a minimum solar irradiance level is able to be determined for the solar panels at a given temperature that causes the solar panels providing power to the inverter to cause the inverter to deliver its rated AC output power. In this example, when the AC output power of the inverter is at its maximum rated output level and the solar irradiance exceeds that minimum solar irradiance level, the inverter is determined to be clipping. Otherwise, the inverter is determined to not be clipping. In various examples, this determination uses real-time solar irradiance and ambient temperature measurements that are generally available at many solar farms.

If an inverter is determined to be clipping, the solar farm power balancing process 400 in an example determines, at 404, if the other inverter that is able to receive power from sub-groups providing power to the first inverter is operating below a threshold. In an example, this determination is based on a reading of the AC output power being currently produced by the other inverter to determine how much additional DC power input could be received by that other inverter. The threshold to which this is compared is able to be determined based on any suitable technique, such as a level below maximum input that corresponds to previously observed amounts of DC input power that are in excess of the rated input of the inverter that has been observed to have been delivered in past scenarios.

In an alternative example, this determination is alternatively able to be made based on a determination that the sky conditions at the solar farm are one of overcast or passing clouds as is determined, for example, by measurements reported by a meteorological station as is described above.

If it is determined that the other inverter is operating below the threshold, the solar farm power balancing process 400 routes, at 406, a sub-group from the clipping inverter to the other inverter that is operating below the threshold.

After routing a sub-group, or if either of the above determinations are false, the solar farm power balancing process 400 returns to determining, at 402, if a first inverter is clipping.

Figure 5:
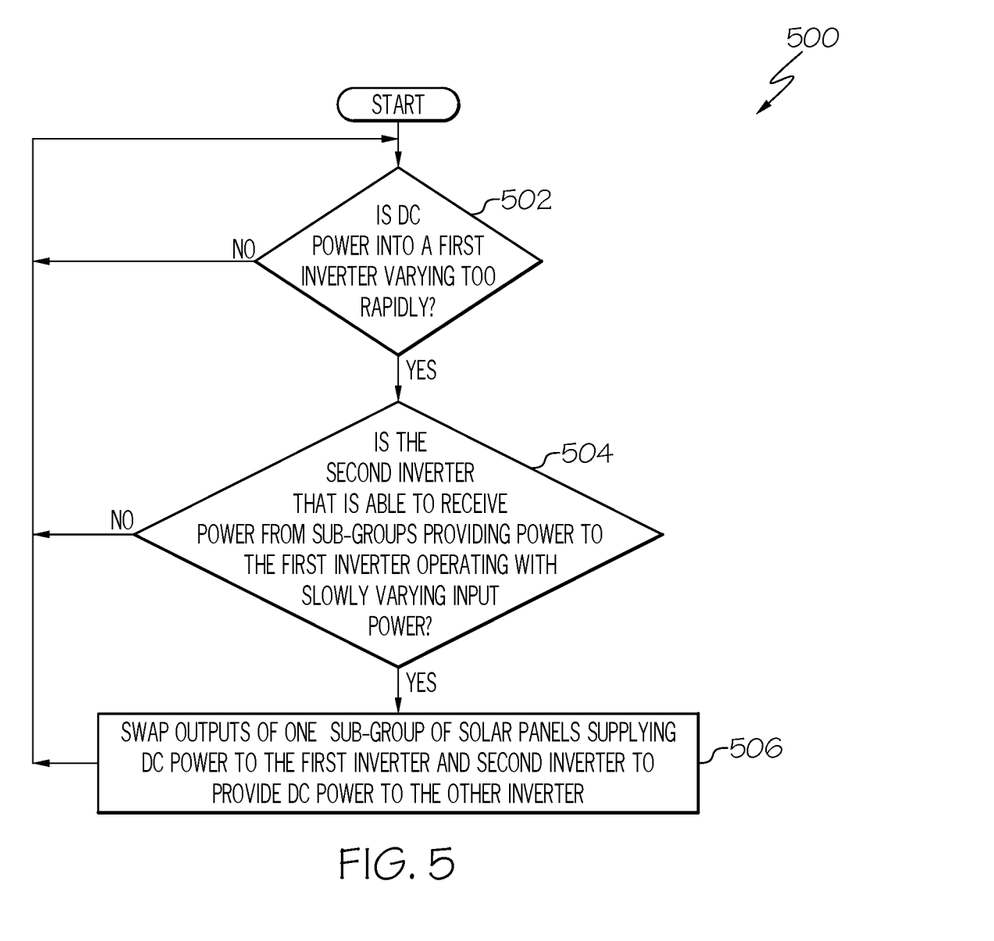
FIG. 5 illustrates a solar farm power stabilizing process, according to an example.

FIG. 5 illustrates a solar farm power stabilizing process 500, according to an example. The solar farm power stabilizing process 500 is an example of a process performed by the controller 130 to control with switches that connect the output of sub-groups of solar panels to one of two inverters. The solar farm power stabilizing process 500 is an example of a process to perform the swapping of DC power inputs to reduce variations as is discussed above with regards to the partial cloud cover solar group output time graphs 300. In an example, the solar farm power stabilizing process 500 redirects DC power from an inverter that is receiving DC power that varies too rapidly to an inverter with a more stable DC power input. In an example, such rapidly varying DC power input can be caused by moving clouds passing between the sun and solar panels providing that DC power. This redirection is able to reduce the variation in DC power being delivered to each inverter, and thereby facilities more efficient and steady operation of the inverters and the solar farm.

The solar farm power stabilizing process 500 determines, at 502, if power delivered to a first inverter is varying too rapidly. In an example, this determination is based on determining that the power delivered to the first inverter varies in excess of a first threshold. The criteria for rapid variation of the DC power are based on various criteria to characterize DC power variations from a group of solar panels that are have cloud cover moving over them. For example, a first threshold may be exceeded if the DC power being provided by a group of solar panels, such as the above described first group of solar panels 102, decreases over fifty percent (50%) over less than one minute or so. Such a variation may lead to an assumption that the decrease is due to moving clouds as these dramatic variations do not occur in the other two sky conditions "clear sky" and "overcast".

In various examples, the DC power delivered to inverters is able to be measured at any suitable point. In examples, variations observed in received DC power as reported by the inverters are able to be monitored for this determination. In some examples, the reported AC output power produced by the inverters is monitored to determine the variation in DC power delivered to the inverters and this determination is alternatively able to be based on determining that variations in reported AC output power exceed the first threshold. In further examples, DC power monitors, such as electrical current monitors, are able to be installed at various locations around the solar farm, such as at the output of each sub-group of solar panels, and the DC power output reported by those monitors is able to be monitored for this determination.

If the DC power into an inverter is determined to be varying too rapidly, the solar farm power stabilizing process 500 determines, at 504, whether the second inverter that is able to receive power from sub-groups providing power to the first inverter operating with slowly varying input power. In an example, slowly varying input power is able to be determined by monitoring reported DC power delivered to the inverter and determining that the power varies by less than a second threshold. In an example, a second threshold is a power variation of less that, e.g., 20 percent over several minutes. In alternative examples, variations in the reported AC power output are also able to be monitored to determine if they are below the second threshold.

If it is determined that the second inverter is able to receive power from sub-groups providing power to the first inverter that is operating with slowly varying input power, the solar farm power stabilizing process 500 swaps, at 506, outputs of one sub-group of solar panels supplying DC power to the first inverter and second inverter to provide DC power to the other inverter.

After swapping outputs of two sub-groups, or if either of the above determinations is false, the solar farm power stabilizing process 500 returns to determining, at 502, if the DC power into a first inverter varying too rapidly.

An example of the above process is a condition where inverter 1 110 is receiving DC power from sub-group 1A 122 and sub-group 1B 124, and inverter 2 112 is receiving DC power from sub-group 2A 142 and sub-group 144. In a situation where moving clouds are obscuring sunlight from sub-group 1A 122 and sub-group 1B 124 but not the solar panels of the second group of solar panels 104, inverter 1 110 reports rapidly varying DC power input and inverter 2 112 reports slowly varying DC power input. Based on such an observation of determined DC power variations, the controller 130 is able to control the above-described switches to swap the DC power output of sub-group 1A 122 and sub-group 2A 142 between inverter 1 110 and inverter 2 112 such that sub-group 1A 122 provides DC power to inverter 2 112 and sub-groups 2A 142 provides DC power to inverter 1 110. In this example, controller 130 commands first switch 126 to change positions to provide the DC power from sub-group 1A 122 to the second inverter input 152 and commands the third switch 146 to provide the DC power from sub-group 2A 142 to the first inverter input 150. This causes the more rapidly varying DC power from sub-group 1A 122 to be added to the more steady DC power from sub-group 2B 144 at the input of inverter 2 112 and thus provide a more constant AC output. The operation of inverter 1 110 is similarly affected by being provided with less varying DC power from the combination of the sub-group 1B 124 and sub-group 2A 142.

Figure 6:
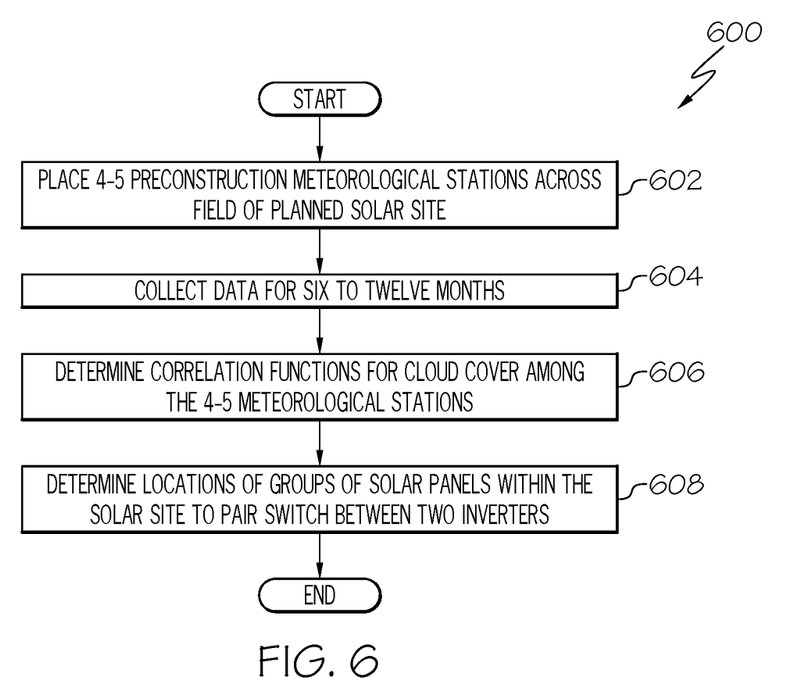
FIG. 6 illustrates a solar farm pre-construction survey process, according to an example.

FIG. 6 illustrates a solar farm pre-construction survey process 600, according to an example. In an example, prior to construction of a solar farm, a pre-construction survey is conducted to collect site survey measurements to support determinations of correlations of simultaneous cloud cover as a function of distance across the area of the solar farm. Based on the determined correlations of cloud cover, i.e., the simultaneous occurrence of cloud cover at two locations as a function of the distance between those two locations, suitable distances between groups of solar panels in the solar farm that are able to be switched into a single inverter is able to be determined.

The solar farm pre-construction survey process 600 places, at 602, about 4 to-5 preconstruction meteorological stations across the field of a planned solar farm. An example of a meteorological station that is able to be deployed is a Photovoltaic Station Weather System that is available from Met One Instruments of Grants Pass, Oregon. In an example, such preconstruction meteorological stations are placed around the site of the planned solar farm so as to have a diversity of distances between their locations. In an example of placing four (4) such meteorological stations across a site, stations are able to be located in a line across the site with separations of 100 Meters between stations 1 and 2, 600 Meters between stations 2 and 3, and 800 Meters between stations 3 and 4.

Data is then collected over a period of time, at 604. In various examples, data is collected with these meteorological stations for between six and twelve months. Other time durations are possible.

Correlation functions are determined based on the collected data, at 606. The correlation function determines correlation of cloud cover at locations that are separated by various distances. Once the irradiance data is available, a function for correlation based on distance could be made.

An example of determining such a correlation function includes having five (5) meteorological stations positioned around the location of the proposed solar farm. After data is collected from those stations, the correlation function for cloud cover can be determined based on the measured data. For example, cloud cover measurements between stations 1 and 2, which are separated by 100 Meters, could be found to have a correlation value of 0.70 and the correlation of cloud cover between stations 3 and 5, which are separated by 500 Meters, could be found to have a value of 0.60. Correlation values for cloud cover between other stations are similarly calculated. In an example with five (5) meteorological stations, there are "5 choose 2" combinations, which is 10 pairs of stations for which correlation values can be determined. In an example, a correlation function determined by the above-described collected data could indicate correlation values at various separation distances across the site such as 0.60 at 500 meters, 0.25 at 1000 meters 0.10 at 2000 meters is approximately 0.10, and so forth.

Locations of groups of solar panels within the solar farm to pair into switches between two inverters are determined, at 608. The determination of these locations is based on, in an example, the above-described determined correlations such that distances between the locations of two groups of solar panels that are connected to a switch for two inverters exhibit a minimum correlation value for cloud cover.

In an example, the determined locations of each set of two groups of solar panels that are connected to each switch selectably connecting those two groups to a respective inverter in the solar farm are selected based on minimizing the sum of correlation values for each respective set of two groups. Selecting these locations such that the sum of correlation values is minimized in an example is able to be solved by an optimization process known in the academic field of optimization as an assignment problem.

Determining these locations in an example results in a first group of solar panels being located in a first area of the solar farm, and a second group of solar panels being located in a second area of the solar farm where the first area is separated from the second area by a distance that is selected to reduce a value of correlation between the first area and second area of cloud cover obscuring sunlight from reaching solar panels in the first area and solar panels reaching solar panels in the second area.

Figure 7:
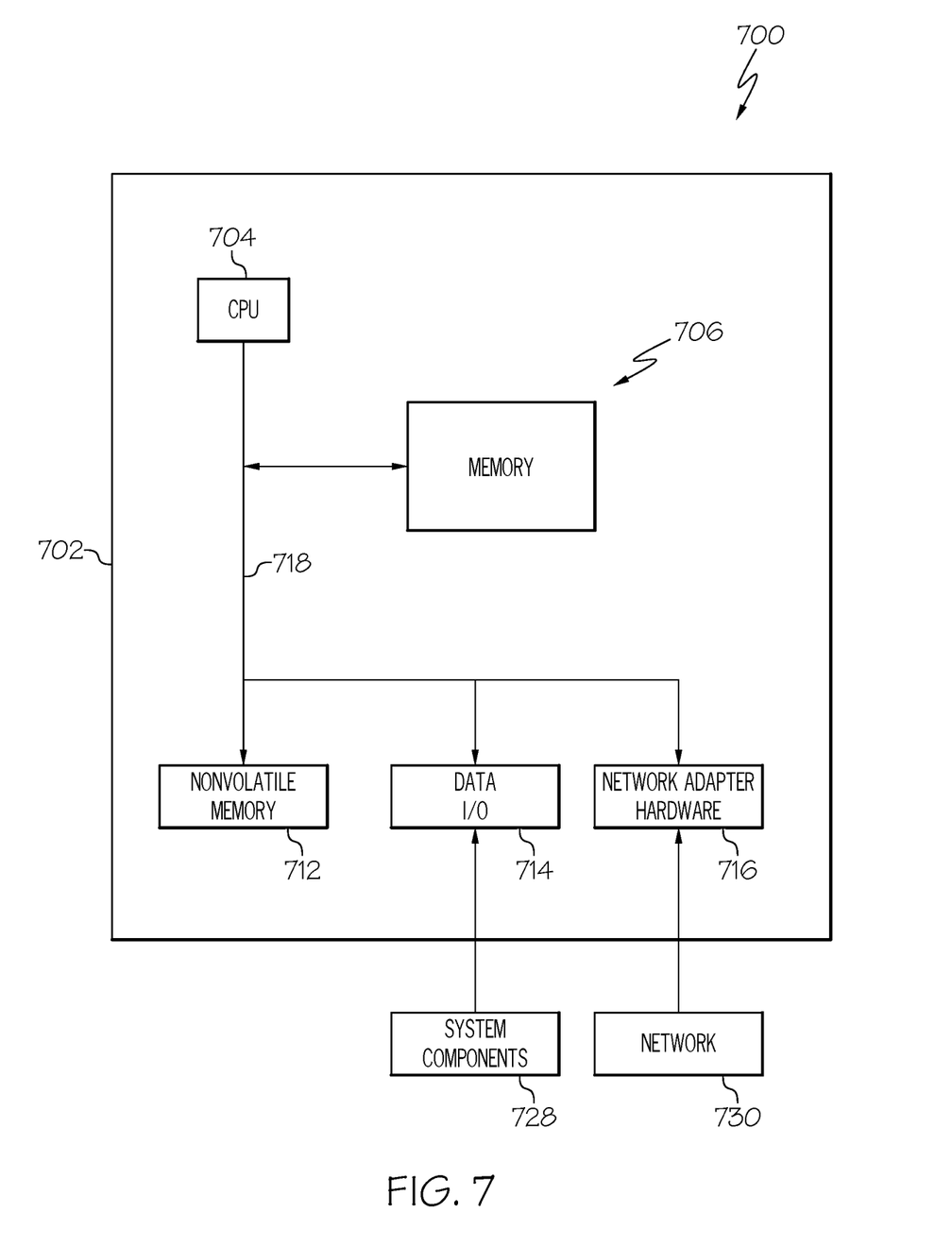
FIG. 7 illustrates a block diagram illustrating a processor, according to an example.

FIG. 7 illustrates a block diagram illustrating a processor 700 according to an example. The processor 700 is an example of a processing subsystem that is able to perform any of the above-described processing operations, control operations, other operations, or combinations of these.

The processor 700 in this example includes a CPU 704 that is communicatively connected to a main memory 706 (e.g., volatile memory), a non-volatile memory 712 to support processing operations. The CPU is further communicatively coupled to network adapter hardware 716 to support input and output communications with external computing systems such as through the illustrated network 730.

The processor 700 further includes a data input/output (I/O) processor 714 that is able to be adapted to communicate with any type of equipment, such as the illustrated system components 728. The data input/output (I/O) processor in various examples is able to be configured to support any type of data communications connections including present day analog and/or digital techniques or via a future communications mechanism. A system bus 718 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general-purpose computer system with a computer program that, when being loaded and executed, controls the computer system such that it carries out the methods described herein.

The present subject matter can also be embedded in a computer program product, which comprises all the features enabling the implementation of the methods described herein, and which-when loaded in a computer system-is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above-described methods and realize the above-described systems.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A solar farm, comprising:
a first inverter comprising a first DC power input;
a second inverter comprising a second DC power input;
a first group of solar panels, a second group of solar panels separate from the first group of solar panels, and a third group of solar panels separate from the first group of solar panels and the second group of solar panels;
a first switch selectably alternately connecting the first group of solar panels to one of the first DC power input or the second DC power input;
a first inverter current monitor configured to, when operating, monitor at least one of electrical current flowing into the first inverter via the first DC power input or out of the first inverter via an AC power output;
a second inverter current monitor configured to, when operating, monitor at least one of electrical current flowing into the second inverter via the second DC power input or out of the second inverter via a second AC power output; and
a controller configured to, when operating:
determine, based on a measurement by the first inverter current monitor while the first switch is connecting the first group of solar panels to the first DC power input, that the first inverter is operating as a clipping inverter;
determine, based on a measurement by the second inverter current monitor while the first switch is connecting the first group of solar panels to the first DC power input and while the second inverter is receiving power from the third group of solar panels, that the second inverter is producing power and operating below a power threshold; and
switch, based on a determination that the first inverter is operating as a clipping inverter and that the second inverter is operating below the power threshold, the first switch to connect the first group of solar panels to the second DC power input.

2. The solar farm of claim 1, further comprising:
a fourth group of solar panels;
a second switch selectably alternately connecting the third group of solar panels to one of the first DC power input or the second DC power input; and
wherein the controller is further configured to, when operating:
determine, based on a measurement by the first inverter current monitor while the first switch is connecting the first group of solar panels to the first DC power input and the second switch is connecting the third group of solar panels to the second DC power input, that the first DC power input is receiving during a time period DC power that is varying at a rate above a first threshold;
determine, during the time period that the first DC power input is receiving DC power that is varying at a rate above the first threshold, that the second inverter is receiving DC power that is varying at a rate below a second threshold;
switch, based on a determination that the first DC power input is receiving DC power that is varying at a rate above the first threshold and the second inverter is receiving DC power that is varying at a rate below the second threshold, the first switch to connect the first group of solar panels to the second DC power input; and
switch the second switch to connect the third group of solar panels to the first DC power input.

3. The solar farm of claim 1, further comprising
a fourth group of solar panels; and
a second switch selectably alternately connecting the third group of solar panels to one of the first DC power input or the second DC power input, and
wherein the controller is further configured to, when operating, based on the determination while the first switch was connecting the first group of solar panels to the first DC power input that the first inverter is operating as a clipping inverter, switch the second switch to connect the third group of solar panels to the first DC power input.

4. The solar farm of claim 3, wherein the first group of solar panels and the second group of solar panels are located in a first area of the solar farm, and the third group of solar panels and the fourth group of solar panels are located in a second area of the solar farm, wherein the first area is separated from the second area by a distance, wherein the distance is selected to reduce a value of correlation between the first area and second area of cloud cover obscuring sunlight from reaching solar panels in the first area and solar panels reaching solar panels in the second area.

5. The solar farm of claim 1,
wherein the controller is further configured to, when operating:
determine, based on a second measurement by the second inverter current monitor after the first switch connects the first group of solar panels to the second DC power input, that the second inverter is operating as a clipping inverter; and
switch, based on a determination that the second inverter is operating as a clipping inverter, the first switch to connect the first group of solar panels to the first DC power input.

6. The solar farm of claim 5, further comprising: a fourth group of solar panels, and a second switch selectably alternately connecting the third group of solar panels to one of the first DC power input or the second DC power input, and wherein the controller is further configured to, when operating: switch,
based on the determination while the first switch is connecting the first group of solar panels to the second DC power input that the second inverter is operating as a clipping inverter and
based on switching, based on the determining that the second inverter is operating as a clipping inverter, the first switch to connect the first group of solar panels to the first DC power input,
the second switch to connect the third group of solar panels to the second DC power input.

7. The solar farm of claim 1, further comprising:
a fourth group of solar panels; and
a second switch selectably alternately connecting the third group of solar panels to one of the first DC power input or the second DC power input,
and wherein the controller is further configured to, when operating:
determine that the second inverter is producing power and operating below a power threshold further based on a measurement by the second inverter current monitor while the first switch is connecting the first group of solar panels to the first DC power input and while the second inverter is receiving power from the third group of solar panels and the fourth group of solar panels; and
switch, based on the determination that the first inverter is operating as a clipping inverter and that the second inverter is operating below the power threshold, the second switch to connect the fourth group of solar panels to the first DC power input.

8. A method of operating a solar farm, where the solar farm comprises a first inverter comprising a first DC power input, a second inverter comprising a second DC power input, a first group of solar panels and a second group of solar panels, a first switch selectably alternately connecting the first group of solar panels to one of the first DC power input or the second DC power input, a third group of solar panels and a fourth group of solar panels, a second switch selectably alternately connecting the third group of solar panels to one of the first DC power input or the second DC power input, and a first inverter current monitor configured to, when operating, monitor at least one of electrical current flowing into the first inverter via the first DC power input or out of the first inverter via an AC power output, the method comprising:
determining, based on a measurement by the first inverter current monitor while the first switch is connecting the first group of solar panels to the first DC power input and the second switch is connecting the third group of solar panels to the second DC power input, that the first DC power input is receiving during a time period DC power that is varying at a rate above a first threshold;
determining, during a time period that the first DC power input is receiving DC power that is varying at a rate above the first threshold, that the second inverter is receiving DC power that is varying at a rate below a second threshold;
switching, based on the determining that the first DC power input is receiving DC power that is varying at a rate above the first threshold and that the second inverter is receiving DC power that is varying at a rate below a second threshold, the first switch to connect the first group of solar panels to the second DC power input; and
switching the second switch to connect the third group of solar panels to the first DC power input.

9. The method of claim 8, further comprising:
receiving, while the first switch is connecting the first group of solar panels to the first DC power input, a current measurement from the first inverter current monitor;
determining, based on the current measurement received while the first switch is connecting the first group of solar panels to the first DC power input, that the first inverter is operating as a clipping inverter; and
switching, based on the determining that the first inverter is operating as a clipping inverter, the first switch to connect the first group of solar panels to the second DC power input.

10. The method of claim 9, wherein the method further comprises switching, based on the determining while the first switch was connecting the first group of solar panels to the first DC power input that the first inverter is operating as a clipping inverter, the second switch to connect the third group of solar panels to the first DC power input.

11. The method of claim 9, wherein the solar farm further comprises a second inverter current monitor configured to, when operating, monitor at least one of electrical current flowing into the second inverter via the second DC power input or out of the second inverter via a second AC power output, and
wherein the method further comprises:
determining, based on a second measurement by the second inverter current monitor after the first switch connects the first group of solar panels to the second DC power input, that the second inverter is operating as a clipping inverter; and
switching, based on the determining that the second inverter is operating as a clipping inverter, the first switch to connect the first group of solar panels to the first DC power input.

12. The method of claim 11, wherein the solar farm further comprises a third group of solar panels and a fourth group of solar panels, and a second switch selectably alternately connecting the third group of solar panels to one of the first DC power input or the second DC power input, and
wherein the method further comprises switching,
based on the determining while the first switch connects the first group of solar panels to the second DC power input, that the second inverter is operating as a clipping inverter and,
based on switching, based on the determining that the second inverter is operating as a clipping inverter, the first switch to connect the first group of solar panels to the first DC power input,
the second switch to connect the third group of solar panels to the second DC power input.

13. The method of claim 8, wherein the first group of solar panels and the second group of solar panels are located in a first area of the solar farm, and the third group of solar panels and the fourth group of solar panels are located in a second area of the solar farm, wherein the first area is separated from the second area by a distance, wherein the distance is selected to reduce a value of correlation between the first area and second area of cloud cover obscuring sunlight from reaching solar panels in the first area and solar panels reaching solar panels in the second area.

14. The method of claim 13, wherein the distance is selected based upon site survey measurements prior to construction of the solar farm.

15. A computer program product for operating a solar farm, where the solar farm comprises at least a first inverter comprising a first DC power input, a second inverter comprising a second DC power input, a first group of solar panels, a second group of solar panels, a third group of solar panels, a first switch selectably alternately connecting the first group of solar panels to one of the first DC power input or the second DC power input, and a first inverter current monitor configured to, when operating, monitor at least one of electrical current flowing into the first inverter via the first DC power input or out of the first inverter via an AC power output, and a second inverter current monitor configured to, when operating, monitor at least one of electrical current flowing into the second inverter via the second DC power input or out of the second inverter via a second AC power output, the computer program product comprising a non-transitory computer readable storage medium having computer readable program code embodied therewith, the computer readable program code comprising instructions for:

receiving, while the first switch is connecting the first group of solar panels to the first DC power input, a current measurement from the first inverter current monitor;

determining, based on the current measurement received while the first switch is connecting the first group of solar panels to the first DC power input, that the first inverter is operating as a clipping inverter;

determining, based on a measurement by the second inverter current monitor while the first switch is connecting the first group of solar panels to the first DC power input and while the second inverter is receiving power from the third group of solar panels, that the second inverter is producing power and operating below a power threshold; and switching, based on the determining that the first inverter is operating as a clipping inverter and that the second inverter is operating below the power threshold, the first switch to connect the first group of solar panels to the second DC power input.

16. The computer program product of claim 15, wherein the solar farm further comprises a fourth group of solar panels; and a second switch selectably alternately connecting the third group of solar panels to one of the first DC power input or the second DC power input, and wherein the computer readable program code further comprises instructions for:

determining, based on a measurement by the first inverter current monitor while the first switch is connecting the first group of solar panels to the first DC power input and the second switch is connecting the third group of solar panels to the second DC power input, that the first DC power input is receiving during a time period DC power that is varying at a rate above a first threshold;

determining, during the time period that the first DC power input is receiving DC power that is varying at a rate above the first threshold, that the second inverter is receiving during a time period DC power that is varying at a rate below a second threshold;

switching, based on the determining that the first DC power input is receiving DC power that is varying at a rate above the first threshold and the second inverter is receiving DC power that is varying at a rate below a second threshold, the first switch to connect the first group of solar panels to the second DC power input; and switching the second switch to connect the third group of solar panels to the first DC power input.

17. The computer program product of claim 15, wherein the solar farm further comprises a fourth group of solar panels, and a second switch selectably alternately connecting the third group of solar panels to one of the first DC power input or the second DC power input, and wherein the computer readable program code further comprises instructions for switching, based on the determining while the first switch was connecting the first group of solar panels to the first DC power input that the first inverter is operating as a clipping inverter, the second switch to connect the third group of solar panels to the first DC power input.

18. The computer program product of claim 17, wherein the first group of solar panels and the second group of solar panels are located in a first area of the solar farm, and the third group of solar panels and the fourth group of solar panels are located in a second area of the solar farm, wherein the first area is separated from the second area by a distance, wherein the distance is selected to reduce a value of correlation between the first area and second area of cloud cover obscuring sunlight from reaching solar panels in the first area and solar panels reaching solar panels in the second area, and wherein the distance is selected based upon site survey measurements prior to construction of the solar farm.

19. The computer program product of claim 15, wherein the computer readable program code further comprises instructions for:

determining, based on a second measurement by the second inverter current monitor after the first switch connects the first group of solar panels to the second DC power input, that the second inverter is operating as a clipping inverter; and switching, based on the determining that the second inverter is operating as a clipping inverter, the first switch to connect the first group of solar panels to the first DC power input.

20. The computer program product of claim 19, wherein the solar farm further comprises a fourth group of solar panels, and a second switch selectably alternately connecting the third group of solar panels to one of the first DC power input or the second DC power input, and wherein the computer readable program code further comprises instructions for switching, based on the determining while the first switch is connecting the first group of solar panels to the second DC power input that the second inverter is operating as a clipping inverter and based on switching, and based on the determining that the second inverter is operating as a clipping inverter, the first switch to connect the first group of solar panels to the first DC power input, the second switch to connect the third group of solar panels to the second DC power input.

* * * * *